United States Patent
Hirata

(10) Patent No.: US 11,110,805 B2
(45) Date of Patent: Sep. 7, 2021

(54) CONTROL DEVICE FOR LEFT AND RIGHT WHEEL DRIVE DEVICE

(71) Applicant: NTN CORPORATION, Osaka (JP)

(72) Inventor: Junichi Hirata, Iwata (JP)

(73) Assignee: NTN CORPORATION, Osaka (JP)

( * ) Notice: Subject to any disclaimer, the term of this patent is extended or adjusted under 35 U.S.C. 154(b) by 166 days.

(21) Appl. No.: 16/294,624

(22) Filed: Mar. 6, 2019

(65) Prior Publication Data
US 2019/0202309 A1 Jul. 4, 2019

Related U.S. Application Data

(63) Continuation of application No. PCT/JP2017/031309, filed on Aug. 31, 2017.

(30) Foreign Application Priority Data

Sep. 7, 2016 (JP) .............................. JP2016-174257

(51) Int. Cl.
*B60L 15/20* (2006.01)
*B60K 1/02* (2006.01)
(Continued)

(52) U.S. Cl.
CPC ............ *B60L 15/2036* (2013.01); *B60K 1/02* (2013.01); *B60K 17/16* (2013.01); *B60K 23/04* (2013.01);
(Continued)

(58) Field of Classification Search
CPC ......... B60L 15/2036; B60L 9/18; B60K 1/02; B60K 17/16; B60K 23/04;
(Continued)

(56) References Cited

U.S. PATENT DOCUMENTS 3,411,369 A * 11/1968 Hammann ................ C07C 1/22
476/7
5,910,470 A * 6/1999 Minami ............... C10M 107/02
508/468
(Continued)

FOREIGN PATENT DOCUMENTS

CN 101678776 A 3/2010
CN 103958928 A 7/2014
(Continued)

OTHER PUBLICATIONS

Extended European Search Report dated Mar. 16, 2020, in corresponding European Patent Application No. 17848643.7 (9 pages).
(Continued)

*Primary Examiner* — Ig T An

(57) ABSTRACT

The control device (67) includes a rotational speed calculator (68), a bearing torque estimator (69), a torque difference calculator (70) and a drive source torque calculator (71). The rotational speed calculator (68) calculates rotational speeds of first and second connection members. The bearing torque estimator (69) estimates a bearing torque, from the calculated, two rotational speeds. The torque difference calculator (70) calculates a target torque difference between torques to be generated by respective drive sources, from the estimated bearing torque, a torque difference amplification factor (α), and a difference between drive wheel torque command values for respective left and right drive wheels. The drive source torque calculation module (71) calculates drive source torque command values, which are torques to be generated by the respective, left and right drive sources, using the calculated, target torque difference and the drive wheel torque command values for the respective wheels.

4 Claims, 11 Drawing Sheets

(51) Int. Cl.
*B60K 23/04* (2006.01)
*F16H 48/10* (2012.01)
*F16H 48/36* (2012.01)
*F16H 48/20* (2012.01)
*B60L 9/18* (2006.01)
*B60K 17/16* (2006.01)

(52) U.S. Cl.
CPC ............... *B60L 9/18* (2013.01); *B60L 15/20* (2013.01); *F16H 48/10* (2013.01); *F16H 48/20* (2013.01); *F16H 48/36* (2013.01); *B60K 2023/043* (2013.01); *B60Y 2200/91* (2013.01); *F16H 2048/364* (2013.01); *Y02T 10/72* (2013.01)

(58) Field of Classification Search
CPC ... B60K 2023/043; F16H 48/10; F16H 48/20; F16H 48/36; F16H 2048/364; B60Y 2200/91; Y02T 10/72
See application file for complete search history.

(56) References Cited

U.S. PATENT DOCUMENTS

| | | | |
|---|---|---|---|
| 8,177,007 | B2 | 5/2012 | Abe et al. |
| 9,002,662 | B2* | 4/2015 | Hori ................ G01M 13/04 702/41 |
| 9,139,195 | B2 | 9/2015 | Noguchi |
| 9,150,090 | B2 | 10/2015 | Hiyoshi et al. |
| 9,205,760 | B2 | 12/2015 | Makino |
| 9,221,334 | B2 | 12/2015 | Knoblauch |
| 10,065,527 | B2 | 9/2018 | Honda |
| 2004/0038775 | A1* | 2/2004 | Shimizu ................ B60K 23/08 477/6 |
| 2004/0044458 | A1* | 3/2004 | Kadota ................ B60K 28/165 701/55 |
| 2009/0038866 | A1* | 2/2009 | Abe ................ B60W 20/00 180/65.7 |
| 2011/0212804 | A1 | 9/2011 | Imamura et al. |
| 2012/0310460 | A1* | 12/2012 | Sato ................ B60W 30/19 701/22 |
| 2013/0074495 | A1* | 3/2013 | Chi ................ F02D 41/1467 60/605.2 |
| 2013/0203543 | A1* | 8/2013 | Sten ................ F16H 48/36 475/150 |
| 2013/0261863 | A1* | 10/2013 | Noguchi ................ B60W 20/00 701/22 |
| 2014/0349812 | A1 | 11/2014 | Hiyoshi et al. |
| 2014/0371016 | A1* | 12/2014 | Knoblauch ................ B60K 1/02 475/5 |
| 2015/0012158 | A1 | 1/2015 | Makino |
| 2017/0008422 | A1* | 1/2017 | Honda ................ B60W 30/045 |

FOREIGN PATENT DOCUMENTS

| | | |
|---|---|---|
| CN | 104080645 A | 10/2014 |
| EP | 2 149 474 A1 | 2/2010 |
| JP | 2008-215519 A | 9/2008 |
| JP | 2008-295173 | 12/2008 |
| JP | 4907390 | 1/2012 |
| JP | 2013-192446 A | 9/2013 |
| JP | 2013-212726 | 10/2013 |
| JP | 2015-21594 | 2/2015 |
| JP | 2015-508353 | 3/2015 |
| SE | 512 198 C2 | 2/2000 |
| WO | WO 2016/114282 A1 | 7/2016 |

OTHER PUBLICATIONS

English Translation by WIPO of the International Preliminary Report on Patentability dated Mar. 21, 2019 in corresponding International Patent Application No. PCT/JP2017/031309 (6 pages).
Japanese Decision of Grant dated Jan. 23, 2018 in corresponding Japanese Application No. 2016-174257.
International Search Report dated Nov. 7, 2017 in corresponding International Application No. PCT/JP2017/031309.
Office Action dated Jul. 9, 2021, in Chinese Application No. 201780054725.0 (11 pages including translation).

* cited by examiner

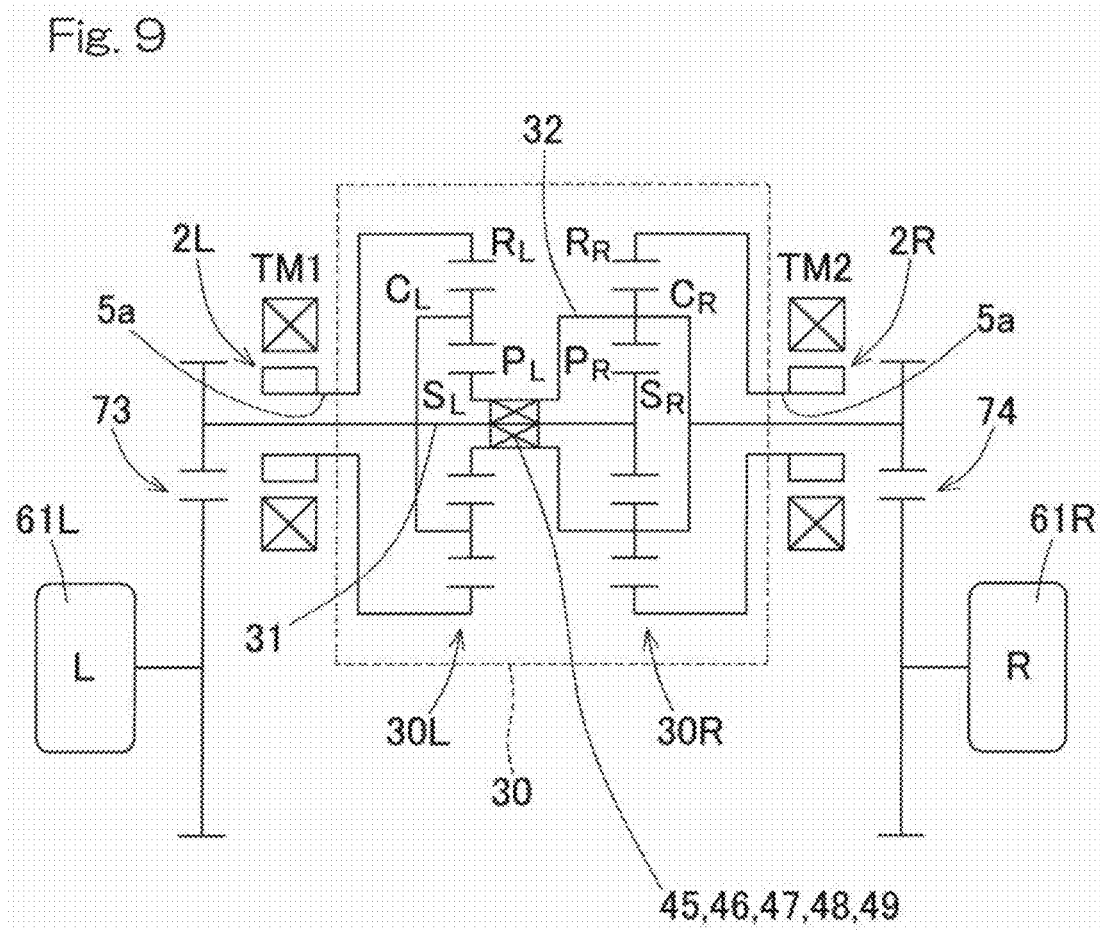

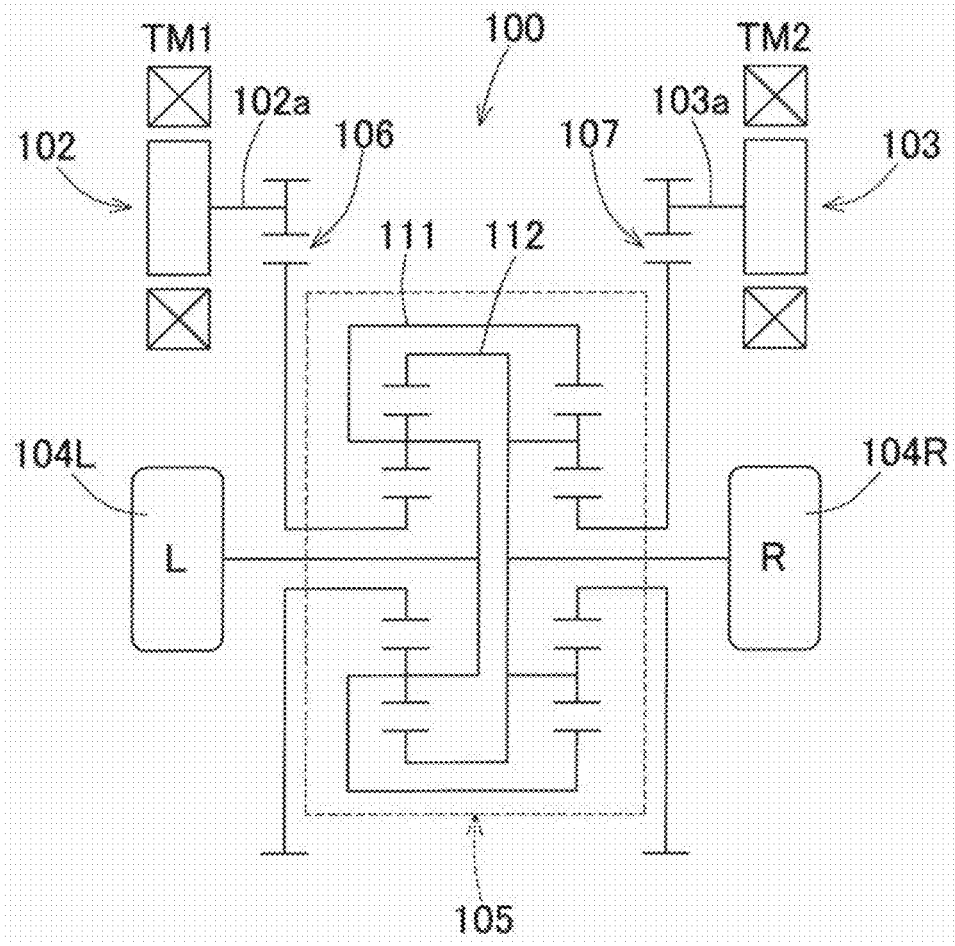

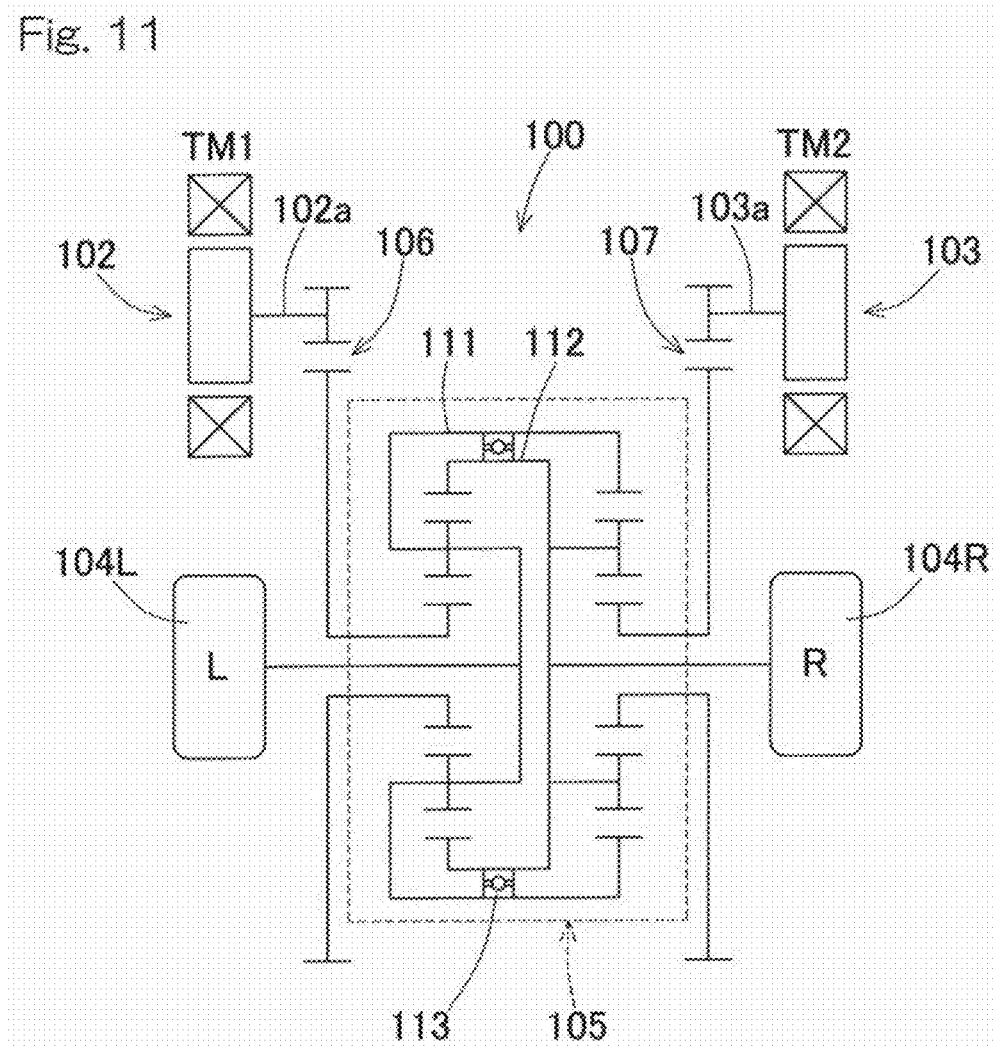

CONTROL DEVICE FOR LEFT AND RIGHT WHEEL DRIVE DEVICE

CROSS REFERENCE TO THE RELATED APPLICATION

This application is a continuation application, under 35 U.S.C. § 111(a), of international application No. PCT/JP2017/031309, filed Aug. 31, 2017, which claims Convention priority to Japanese patent application No. 2016-174257, filed Sep. 7, 2016, the entire disclosure of which is herein incorporated by reference as a part of this application.

BACKGROUND OF THE INVENTION

Field of the Invention

The present invention relates to a control device for a left and right wheel drive device, with which a difference between torques provided from two independent drive sources is amplified and transferred.

Description of Related Art

For a vehicle such as an electric vehicle, it is known to equip electric motors to left and right, respective drive wheels and independently control each electric motor to produce an appropriate, drive torque difference between the left and right wheels in order to control a turning moment of the vehicle. For example, each electric motor may be independently coupled, through a speed reducer, to a corresponding one of the left and right drive wheels, in which case the rotational speed of each electric motor is reduced by the respective speed reducer while the output torque of each electric motor is amplified by the same respective speed reducer, before being transferred to a corresponding one of the left and right drive wheels.

To provide similar behaviors of the vehicle between the times of right turning and left turning of the vehicle, each electric motor has identical output characteristics and the respective speed reducers also have identical speed reduction ratios. Thus, in order for a drive torque difference to be produced between the left and right drive wheels, a certain torque difference needs to be created by and between the electric motors. In this case, given the identical speed reduction ratios of the respective speed reducers, the ratio between drive torques of the left and right, respective drive wheels and the drive torque difference between the left and right drive wheels is the same as the ratio between output torques of the respective electric motors and the output torque difference between the respective electric motors. In other words, it is not possible to produce a drive torque difference between the left and right drive wheels that is greater than the product of the speed reduction ratio and the output torque difference between the electric motors.

Meanwhile, there are situations in which producing a considerable difference between the drive torques of the left and right drive wheels is beneficial to perform a smoother turning travel of the vehicle or to suppress undesirable changes in the vehicle behavior such as excessive understeering and excessive oversteering. Therefore, it is desirable to amplify the difference between torques that are output from two electric motors, before they are transferred to left and right drive wheels.

As regards this, the disclosures of a left and right wheel drive device have been found (Patent Documents 1 and 2) that includes, between two drive sources and left and right drive wheels, a gearing system having two planetary gear mechanisms of three elements with two degrees of freedom that are assembled on a common axis to amplify a torque difference.

As shown in FIG. 10, a left and right wheel drive device 100 of Patent Document 1 includes first and second electric motors 102 and 103 installed in a vehicle, a left drive wheel 104L, a right drive wheel 104R, a gearing system 105 disposed therebetween, and speed reduction gear trains 106 and 107. The first and second electric motors 102 and 103 are powered by power supply from a battery (not shown) installed in the vehicle, are separately or individually controlled by an electronic control unit (not shown), and generate and output different torques. The output shaft 102a of the first electric motor 102 and the output shaft 103a of the second electric motor 103 are coupled through the respective speed reduction gear trains 106 and 107 to first and second connection members 111 and 112 of the gearing system 105. Each of the torques generated by the first and second electric motors 102 and 103 is transferred through the speed reduction gear train 106 or 107 and the gearing system 105 to the left or right drive wheel 104L or 104R.

RELATED DOCUMENT

Patent Document

[Patent Document 1] JP Laid-Open Patent Publication No. 2015-021594
[Patent Document 2] JP Patent No. 4907390

SUMMARY OF THE INVENTION

The first connection member 111 and the second connection member 112 are arranged on a common axis. When, as shown in FIG. 11, a plurality of bearings 113 are arranged between the first connection member 111 and the second connection member 112, for example, different rotational speeds between the left and right drive wheels 104L and 104R create different rotational speeds between the first connection member 111 and the second connection member 112, thereby causing the plurality of bearings 113 to rotate. Rotations of the plurality of bearings 113 generate bearing torques, each of which acts on the first and second connection members 111 and 112. Thus, for example, when the first and second connection members 111 and 112 rotate in the same direction with the rotational speed of the first connection member 111 being smaller than that of the second connection member 112, a relation described by Equation (50) below holds in which Tb represents a bearing torque. It should be noted that, in principle, the torques TM1 and TM2 output from the respective electric motors 102 and 103 would be—as they are input through the respective speed reduction gear trains 106 and 107 into the respective connection members 111 and 112—modified according to the relevant speed reduction ratios. In the following discussion of the equation and more, however, it is assumed that the speed reduction ratios are equal to 1 and that the torques to be input into the respective connection members 111 and 112 are therefore unchanged from TM1 and TM2, respectively, for easier understanding.

$$(TL-TR) = \alpha * (TM1 - TM2) - 2\Sigma Tb \qquad (50)$$

where TL represents a drive torque transferred to the left drive wheel 104L, TR represents a drive torque transferred to the right drive wheel 104R, α represents a torque difference amplification factor, TM1 represents a drive torque generated to by the first electric motor 102, and TM2 represents a drive torque generated by the second electric motor 103.

Thus, a torque difference between the left and right drive wheels 104L and 104R deviates from a value that is solely calculated from the torque difference amplification factor α—which depends on the numbers of teeth of the gears in the gearing system 105—and the torque difference between the two electric motors 102 and 103. Note that the sum of the torques of the left and right drive wheels 104L and 104R is not influenced by the presence of the bearings 113. On the other hand, the bearing torques have an effect only on the difference between left and right drive torques. This also holds in Patent Document 2.

When there is a difference between the rotational speeds of the left and right drive wheels 104L and 104R—which can occur during the turning of the vehicle or during one of the wheels being idle, etc.—and if such bearings 113 are disposed in the left and right wheel drive device that is installed to the vehicle, the effect of the bearing torques arises due to the bearings 113. Thus, if the drive torques of the drive sources are determined without taking into account the effect of the bearing torques when the rotational speeds of the left and right drive wheels 104L and 104R are different from each other, the resulting torque difference between the left and right drive wheels 104L and 104R would become greater or smaller than intended due to the effect of the bearing torques, with the possibility that the originally intended turning moment cannot be effected.

An object of the present invention is to provide a control device for a left and right wheel drive device, which enables precise control of the torques generated by drive sources by taking into account the effect of bearing torque(s).

For the purpose of easier understanding, the discussions that follow contain reference characters used in embodiments.

The present invention provides, in one aspect thereof, a control device 67 for a left and right wheel drive device, wherein the left and right wheel drive device 1 includes two independently controllable drive sources 2L and 2R installed in a vehicle and a gearing system 30 disposed between the two drive sources 2L and 2R and left and right drive wheels 61L and 61R for transferring torques supplied from the two drive sources 2L and 2R to the respective left and right drive wheels 61L and 61R while amplifying a difference between the supplied torques, the gearing system 30 including first and second planetary gear mechanisms 30L and 30R, each including a plurality of constituent members (components), a set of the first and second planetary gear mechanisms 30L and 30R including:

a first connection member 31 that connects a first constituent member among the plurality of constituent members of the first planetary gear mechanism 30L (30R) and a second constituent member among the plurality of constituent members of the second planetary gear mechanism 30R (30L);

a second connection member 32 that connects a second constituent member among the plurality of constituent members of the first planetary gear mechanism 30L (30R) and a first constituent member among the plurality of constituent members of the second planetary gear mechanism 30R (30L);

a first rotational member $C_L$ ($C_R$) that rotates as a unit with the first connection member 31, the first rotational member $C_L$ ($C_R$) being at least one of the plurality of constituent members of the first planetary gear mechanism 30L (30R);

a second rotational member $C_R$ ($C_L$) that rotates as a unit with the second connection member 32, the second rotational member $C_R$ ($C_L$) being at least one of the plurality of constituent members of the second planetary gear mechanism 30R (30L); and bearing(s) 45, 46, 47, 48 and/or 49 arranged between the first connection member 31 or the first rotational member $C_L$ ($C_R$), on one hand, and the second connection member 32 or the second rotational member $C_R$ ($C_L$), on the other hand, wherein the control device 67 includes:

a rotational speed calculation module 68 configured to calculate rotational speeds of the respective first and second connection members 31 and 32;

a bearing torque estimation module 69 configured to estimate bearing torque(s) generated by the bearing(s) 45, 46, 47, 48 and/or 49, from the two rotational speeds calculated by the rotational speed calculation module 68;

a torque difference calculation module 70 configured to calculate a target torque difference between torques to be generated by the two respective drive sources 2L and 2R, using a difference between left and right drive wheel torque command values for the respective left and right drive wheels 61L and 61R, the bearing torque(s) estimated by the bearing torque estimation module 69, and a torque difference amplification factor α of the gearing system 30; and a drive source torque calculation module 71 configured to calculate drive source torque command values, which are torques to be generated by the two respective drive sources 2L and 2R, using the target torque difference calculated by the torque difference calculation module 70 and the left and right drive wheel torque command values.

The torque difference amplification factor α depends on the numbers of teeth of gears in the gearing system 30.

According to such a configuration, the rotational speed calculation module 68 calculates rotational speeds of the first and second connection members 31 and 32. The bearing torque estimation module 69 estimates bearing torque(s) generated by the bearing(s) 45, 46, 47, 48 and/or 49, from the two rotational speeds calculated by the rotational speed calculation module 68. For instance, a large difference between the rotational speeds of the first connection member 31 and the second connection member 32 causes the bearing(s) 45, 46, 47, 48 and/or 49 to generate bearing torque(s), which decreases the difference between the rotational speeds of the first and second connection members 31 and 32.

The torque difference calculation module 70 calculates a target torque difference between torques to be generated by the two respective drive sources 2L and 2R, using a difference between left and right drive wheel torque command values, the bearing torque(s) estimated by the bearing torque estimation module 69, and the torque difference amplification factor α. The left and right drive wheel torque command values are, for example, provided from a control unit 66, which is superordinate to the control device 67. The drive source torque calculation module 71 calculates drive source torque command values, which are torques to be generated by the two respective drive sources 2L and 2R, using the target torque difference calculated by the torque difference calculation module 70 and the left and right drive wheel torque command values. The two drive sources 2L and 2R are driven in accordance with the drive source torque command values. As such, bearing torque(s) generated by the bearing(s) 45, 46, 47, 48 and/or 49—which is/are arranged between the first connection member 31 or the first rotational member $C_L$ ($C_R$), on one hand, and the second connection member 32 or the second rotational member $C_R$ ($C_L$), on the other hand—is/are estimated, and a target torque difference between torques to be generated by the two drive sources 2L and 2R is calculated using the estimated bearing torque(s). In this way, even if there is a large difference between the rotational speeds of the left and right drive wheels 61L and 61R, drive torques substantially matching the originally issued drive wheel torque command values can be effected by calculating a target torque difference using the bearing torque(s). As such, taking into account the effect of bearing torque(s) allows for precise control of the torques to be generated by the drive sources 2L and 2R. Therefore, the originally intended turning moment can be effected.

The bearing torque estimation module 69 may be configured to estimate the bearing torque(s) generated by the bearing(s) 45, 46, 47, 48 and/or 49, from a temperature determined by a temperature measurement device 72 that measures a temperature of lubricant oil for lubricating the bearing(s) 45, 46, 47, 48 and/or 49 and the two rotational speeds calculated by the rotational speed calculation module 68. In this case, a kinematic viscosity of lubricant oil for lubricating the bearing(s) 45, 46, 47, 48 and/or 49 can be determined with improved accuracy by taking into account the temperature of that lubricant oil. This enable the bearing torque(s) to be more accurately estimated.

The bearing torque estimation module may be configured to, when a difference between the rotational speeds of the first and second connection members 31 and 32 that are calculated by the rotational speed calculation module 68 is equal to or more than a threshold value, estimate the bearing torque(s) from the two rotational speeds and to, when the difference between the rotational speeds is less than the threshold value, estimate the bearing torque(s) as zero.

The threshold value is a threshold that can be selected as appropriate during a design stage, etc. For example, an appropriate threshold may be calculated on the basis of an experiment and/or a simulation so as to be set.

According to such a configuration, a computational load on the control device 67 is reduced because estimation of the bearing torque(s) is only performed when a difference between the rotational speeds of the first and second connection members 31 and 32 is equal to or more than the threshold value.

Each of the first and second planetary gear mechanisms 30L and 30R may include a ring gear $R_L$ or $R_R$, a planetary carrier $C_L$ or $C_R$ arranged coaxially with the ring gear $R_L$ or $R_R$ and a sun gear $S_L$ or $S_R$ arranged coaxially with the ring gear $R_L$ or $R_R$, wherein the first constituent member of the first planetary gear mechanism 30L is the planetary carrier $C_L$ thereof, wherein the second constituent member of the second planetary gear mechanism 30R is the sun gear $S_R$ thereof, wherein the second constituent member of the first planetary gear mechanism 30L is the sun gear $S_L$ thereof, wherein the first constituent member of the second planetary gear mechanism 30R is the planetary carrier $C_R$ thereof, and wherein the gearing system 30 has the first and second connection members 31 and 32 as input members and has the ring gears $R_L$ and $R_R$ of the two planetary gear mechanisms 30L and 30R as output members. Such a configuration allows for precise control of the torques to be generated by the drive sources 2L and 2R by taking into account the effect of the bearing torque(s).

Each of the two drive sources 2L and 2R may be an electric motor. In this case, for example, drive torques can be controlled with faster response and more precision compared to drive sources such as an internal combustion engine.

Any combinations of at least two features, disclosed in the appended claims and/or the specification and/or the accompanying drawings should be construed as included within the present invention. In particular, any combinations of two or more of the appended claims should be equally construed as included within the present invention.

BRIEF DESCRIPTION OF THE DRAWINGS

In any event, the present invention will become more clearly understood from the following description of preferred embodiments thereof in connection with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference characters are used to denote like parts throughout different figures, and:

FIG. 9 is a skeleton diagram depicting a left and right wheel drive device, according to a third embodiment of the present invention;

FIG. 10 is a skeleton diagram depicting a conventional example of a left and right wheel drive device; and FIG. 11 is a skeleton diagram of the left and right wheel drive device of FIG. 10 with additional illustration of bearings.

DESCRIPTION OF EMBODIMENTS

Figure 1:
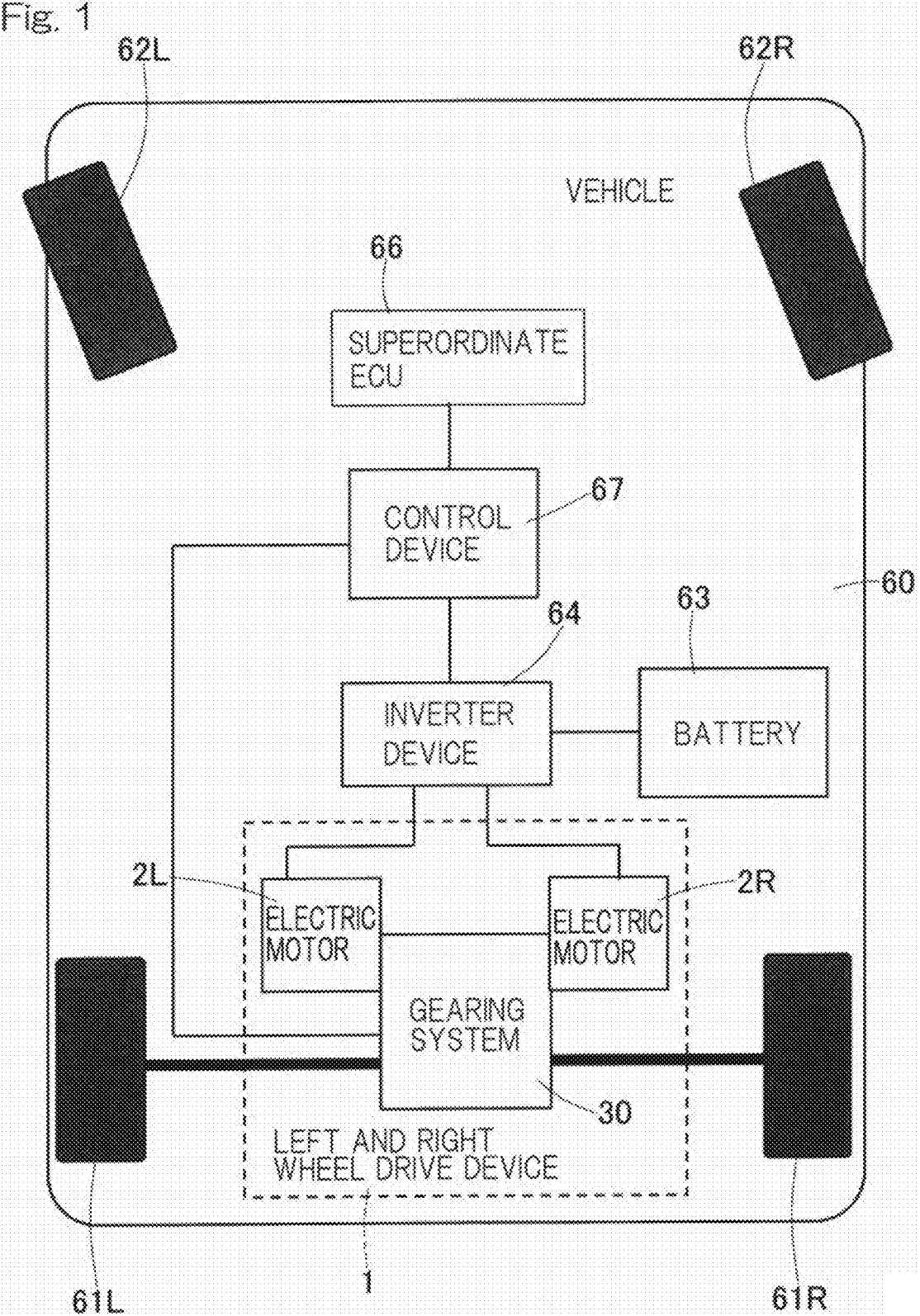
FIG. 1 is a block diagram depicting the concept configuration of a vehicle installed with a control device for a left and right wheel drive device, according to a first embodiment of the present invention.

A control device for a left and right wheel drive device according to a first embodiment of the present invention will be described in connection with FIG. 1 to FIG. 7. FIG. 1 is a block diagram depicting the concept configuration of a vehicle (electric vehicle) installed with the control device for the left and right wheel drive device. The vehicle is of a rear wheel drive design and includes a chassis 60, drive wheels 61L and 61R, which are rear wheels, front wheels 62L and 62R, the left and right wheel drive device 1, a superordinate ECU 66, the control device 67, an inverter device 64, a battery 63 and so on. The left and right wheel drive device 1 includes first and second electric motors 2L and 2R, and a gearing system 30. The first and second electric motors 2L and 2R, installed to the vehicle, are two independently controllable drive sources. The gearing system 30 is disposed between the first and second electric motors 2L and 2R and the drive wheels 61L and 61R.

<Schematic Configuration of Control System>

The superordinate ECU 66 is a control unit which is superordinate to the control device 67 and which, for example, has functionality for performing supervisory control and coordinated control of the vehicle as a whole and functionality for generating left and right drive wheel torque command values. The superordinate ECU 66 generates the left and right drive wheel torque command values, from an acceleration command that is output from an accelerator manipulation device (not shown), a deceleration command that is output from a brake manipulation device (not shown), and a turning command that is output from a steering angle sensor and such (not shown). On the basis of the left and right drive wheel torque command values provided from the superordinate ECU 66, the control device 67 provides drive source torque command values to the inverter device 64. In this way, the first and second electric motors 2L and 2R are separately controlled. The inverter device 64 converts a DC power from the battery 63 into an AC power for driving the first and second electric motors 2L and 2R. The outputs from the left and right wheel drive device 1 are transferred through constant velocity joints to the left and right drive wheels 61L and 61R.

<Left and Right Wheel Drive Device 1>

Figure 2:
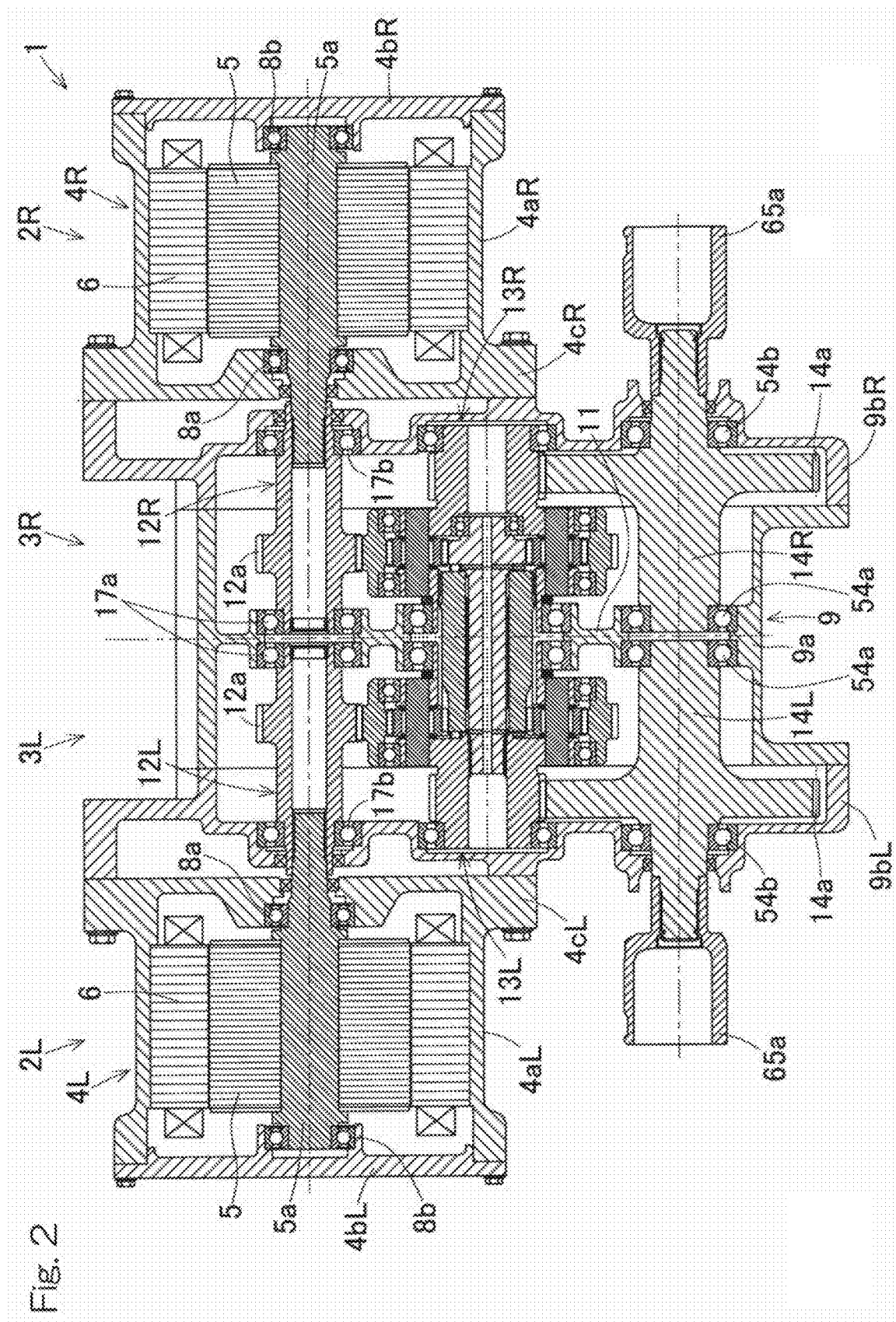
FIG. 2 is a sectional view of the left and right wheel drive device of FIG. 1.

As shown in FIG. 2, the left and right wheel drive device 1 includes the first and second electric motors 2L and 2R, and left and right speed reducers 3L and 3R. The left and right speed reducers 3L and 3R are disposed between the left and right drive wheels 61L and 61R (FIG. 1) and the first and second electric motors 2L and 2R. In this embodiment, the first and second electric motors 2L and 2R have the same specifications or standards and the same maximum output.

<<First and Second Electric Motors 2L and 2R>>

Each of the first and second electric motors 2L and 2R has a motor housings 4L or 4R, a stators 6, and a rotor 5. The first and second electric motors 2L and 2R are of a radial gap type design in which the stator 6 or 6 is arranged on an inner peripheral surface of the motor housing 4L or 4R and in which the rotor 5 is arranged internally of the inner periphery of each stator 6 with a gap formed therebetween.

Each of the motor housings 4L and 4R has a cylindrical, a motor housing body 4aL or 4aR, an outward side wall 4bL or 4bR, and an inward side wall 4cL or 4cR. The outward side walls 4bL and 4bR cover outward side faces of the motor housing bodies 4aL and 4aR, which are at respective outboard sides. The inward side walls 4cL and 4cR are provided at inward side faces of the motor housing bodies 4aL and 4aR, which are at respective inboard sides, to form separation walls that provide physical isolation from the respective speed reducers 3L and 3R. In the inward side walls 4cL and 4cR, openings are provided from which respective motor shafts 5a are extended to inboard directions. It should be noted that, herein, a side of the left and right wheel drive device 1, when installed to the vehicle, facing an exterior of the vehicle as viewed along a widthwise direction of the vehicle is referred to as "outboard," whereas a side of the device 1 facing a center of the vehicle as viewed along the widthwise direction of the vehicle is referred to as "inboard."

The stators 6 and 6 are fixedly fitted onto the inner peripheral surfaces of the respective motor housing bodies 4aL and 4aR. Each of the rotors 5 has a motor shaft 5a at a center thereof. A rolling bearing 8a is provided in each of the inward side walls 4cL and 4cR, and a rolling bearing 8b is also provided in each of the outward side walls 4bL and 4bR. Each motor shaft 5a is rotatably supported via the rolling bearings 8a and 8b by the motor housing 4L or 4R. The left and right motor shafts 5a and 5a are arranged on a common axis, that is, they are arranged coaxially.

<<Speed Reducers 3L and 3R>>

The speed reducers 3L and 3R have a common speed reducer housing 9. Further, each of the speed reducers 3L and 3R has an input gear shaft 12L or 12R, an intermediate gear shaft 13L or 13R, and an output gear shaft 14L or 14R. The speed reducer housing 9 accommodates these gear shafts. The speed reducer housing 9 is of a three-piece construction that is formed from three pieces divided along a direction perpendicular to an axial direction defined by the gear shafts. In particular, the speed reducer housing 9 has a central housing 9a, and left and right lateral housings 9bL and 9bR fixed to opposite lateral faces of the central housing 9a.

Outboard side faces of the lateral housings 9bL and 9bR and the inward side walls 4cL and 4cR are secured with a plurality of bolts. In this way, the two electric motors 2L and 2R are fixed to left and right opposite ends of the speed reducer housing 9, respectively. In the central housing 9a, a partition wall 11 is provided at a center thereof. The speed reducer housing 9 is partitioned by the partition wall 11 into two, left and right halves, and these halves accommodate respective left and right speed reducer bodies. The left and right speed reducer bodies have geometries that are left-right symmetric to each other and each includes the input gear shaft 12L or 12R, the intermediate gear shaft 13L or 13R, and the output gear shaft 14L or 14R.

Each of the input gear shafts 12L and 12R has an input gear 12a for transferring mechanical powers received from the corresponding motor shaft 5a. Rolling bearings 17a are provided in respective bearing fitting holes made in the partition wall 11, and rolling bearings 17b are provided in respective bearing fitting holes made in the left and right lateral housings 9bL and 9bR. Opposite ends of each of the input gear shafts 12L and 12R are rotatably supported via the rolling bearings 17a and 17b by the speed reducer housing 9. The input gear shafts 12L and 12R have hollow structures. Into the hollow cavities of the input gear shafts 12L and 12R, inboard ends of the respective motor shafts 5a are inserted. Further, the input gear shafts 12L and 12R and the respective motor shafts 5a are coupled to each other with splines (which encompass "serrations"; the term "spline" used hereinafter also encompasses "serrations.")

Figure 3:
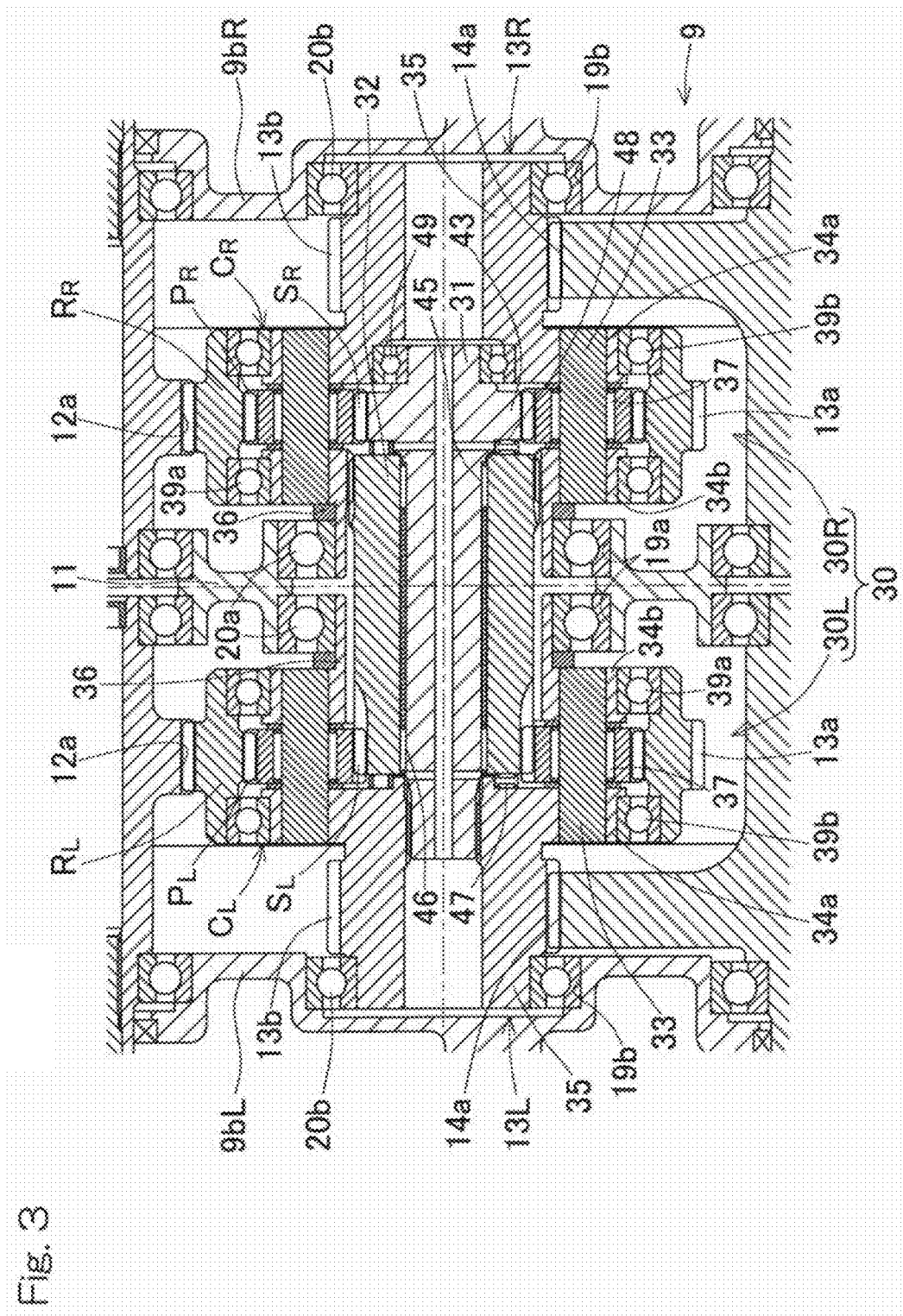
FIG. 3 is a sectional view, on an enlarged scale, depicting a portion of the left and right wheel drive device of FIG. 1 where a gearing system is contained.

As shown in FIG. 3, the left and right intermediate gear shafts 13L and 13R are arranged on a common axis. The intermediate gear shafts 13L and 13R have input-side external gears 13a and 13a, having lager diameters and meshing with the input gears 12a and 12a, and output-side gears 13b and 13b, having smaller diameters and meshing with output gears 14a and 14a which will be discussed later. Rolling bearings 20a are provided in bearing fitting holes 19a made in the partition wall 11, and rolling bearings 20b are provided in bearing fitting holes 19b made in the left and right lateral housings 9bL and 9bR. Opposite ends of each of the intermediate gear shafts 13L and 13R are rotatably supported via the rolling bearings 20a and 20b by the speed reducer housing 9. Each of the bearing fitting holes 19a and 19b has a stepped shape with which an end face of an outer ring of the rolling bearing 20a or 20b comes into contact. The bearing fitting holes 19a and 19a penetrate associated walls so that first and second connection members 31 and 32—which will be discussed later—can pass therethrough.

The gearing system 30 is incorporated into the intermediate gear shafts 13L and 13R in a coaxial manner to the intermediate gear shafts 13L and 13R. The gearing system 30 amplifies a difference between the torques (drive torques) provided from the two electric motors 2L and 2R (FIG. 2). The gearing system 30 includes two planetary gear mechanisms 30L and 30R of three elements with two degrees of freedom. In this example, single pinion planetary gear mechanisms are employed as the planetary gear mechanisms 30L and 30R. The two planetary gear mechanisms 30L and 30R are arranged on a common axis.

The planetary gear mechanisms 30L and 30R includes ring gears $R_L$ and $R_R$, first and second sun gears $S_L$ or $S_R$, planetary gears $P_L$ and planetary gears $P_R$, and first and second planetary carriers $C_L$ and $C_R$. The planetary gear mechanisms 30L and 30R share the first and second connection members 31 and 32. The ring gears $R_L$ and $R_R$ are internal gears that are incorporated into the input-side external gears 13a and 13a of the intermediate gear shafts 13L and 13R, respectively. Each of the sun gears $S_L$ and $S_R$ is a sun gear arranged coaxially with the corresponding ring gear $R_L$ or $R_R$. The planetary gears $P_L$ and the planetary gears $P_R$ are revolution gears meshing with the respective ring gears $R_L$ and $R_R$ and the respective sun gears $S_L$ and $S_R$. The planetary carriers $C_L$ and $C_R$ are joined to the respective planetary gears $P_L$ and $P_R$ and are arranged coaxially with the respective ring gears $R_L$ and $R_R$. To each of the planetary carriers $C_L$ and $C_R$, the corresponding output-side gear 13b or 13b, having smaller diameters, of the intermediate gear shaft 13L or 13R is joined.

The first connection member 31 connects the first planetary carrier $C_L$—which is one of the constituent members of the planetary gear mechanism 30L on the left side in FIG. 3—and the second sun gear $S_R$—which is one of the constituent members of the planetary gear mechanism 30R on the right side in FIG. 3. The second connection member 32 connects the first sun gear $S_L$—which is one of the constituent members of the planetary gear mechanism 30L on the left side in FIG. 3—and the second planetary carrier $C_R$—which is one of the constituent members of the planetary gear mechanism 30R on the right side in FIG. 3.

Each of the planetary carriers $C_L$ and $C_R$ has carrier pins 33 that support the planetary gears $P_L$ or $P_R$, a carrier flange 34a or 34a, which is at an outboard side, and a carrier flange 34b or 34b, which is at an inboard side. The planetary gears $P_L$ and the planetary gears $P_R$ are supported via needle roller bearings 37 and 37 by the respective carrier pins 33 and 33. The outboard carrier flanges 34a and 34a are coupled to outboard ends of the respective carrier pins 33 and 33. The inboard, carrier flanges 34b and 34b are coupled to inboard ends of the respective carrier pins 33 and 33.

Each of the outboard carrier flanges 34a and 34a has a hollow shaft portion 35 or 35 that extends in an outboard direction. An outboard end of each of the hollow shaft portions 35 and 35 is supported via the rolling bearing 20b or 20b at one of the bearing fitting holes 19b and 19b that are made in the lateral housings 9bL and 9bR, respectively. Each of the inboard carrier flanges 34b and 34b has a hollow shaft portion 36 that extends in an inboard direction. An inboard end of each of the hollow shaft portions 36 and 36 is supported via the rolling bearing 20a or 20a at one of the bearing fitting holes 19a and 19a that are made in the partition wall 11. Rolling bearings 39a and 39b are arranged between the ring gear $R_L$ and outer peripheral surfaces of the carrier flange 34b and of the carrier flange 34a of the planetary gear mechanism 30L on the left side in the figure, as well as between the ring gear $R_R$ and outer peripheral surfaces of the carrier flange 34b and of the carrier flange 34a of the planetary gear mechanism 30R on the right side in the figure.

The first and second connection members 31 and 32 that connect the two planetary gear mechanisms 30L and 30R together are assembled in such a way to pass through the partition wall 11 that divides the central housing 9a (FIG. 2) into left and right volumes. The first and second connection members 31 and 32, which are arranged on a common axis, are both rotatably supported via a thrust bearing 47 along an axial direction and are both rotatably supported via a deep groove ball bearing 49 along a radial direction. Furthermore, besides the bearing 47 and the bearing 49, there are additional bearings 45 and 46 and a thrust bearing 48 that are arranged between the first and second connection members 31 and 32. Each of the additional bearings 45 and 46 is a needle roller bearing. The second connection member 32 has a hollow shaft, and the first connection member 31 has a shaft which is inserted inside this hollow shaft.

Mutually meshing splines are provided on an outer peripheral surface of the second connection member 32, at one of outboard sides thereof which is depicted on the right side in FIG. 3, and on the hollow shaft portion 36 of the inboard carrier flange 34b of the planetary carrier $C_R$. Thus, the second connection member 32 is coupled to the planetary carrier $C_R$ through spline engagement. Therefore, the planetary carrier $C_R$, which is a second rotational member, rotates as a unit with the second connection member 32.

Mutually meshing splines are provided on an outer peripheral surface of the first connection member 31, at one of outboard sides thereof which is depicted on the left side in FIG. 3, and on the hollow shaft portion 35 of the outboard, carrier flange 34a of the planetary carrier $C_L$. Thus, the first connection member 31 is coupled to the planetary carrier $C_L$ through spline engagement. Therefore, the planetary carrier $C_L$, which is a first rotational member, rotates as a unit with the first connection member 31.

The first and second connection members 31 and 32 are coupled to the planetary carriers $C_L$ and $C_R$ through spline engagement, respectively, as described above, which enables the two planetary gear mechanisms 30L and 30R to be separated in opposite, left and right directions, thereby making it possible to assemble them, together with the other speed reducer shafts, into the speed reducer housing 9 of a three-piece construction from the left and right directions. An end of the second connection member 32 coupled to the planetary carrier $C_L$, has an outer peripheral surface that is formed with an external gear which serves as the sun gear $S_L$ of the planetary gear mechanism 30L on the left side in FIG. 3. The external gear which serves as the sun gear $S_L$ meshes with the planetary gears $P_L$.

The first connection member 31 has, at an end thereof which is proximal to the planetary gear mechanism 30R on the right side in FIG. 3, a larger diameter segment 43. The larger diameter segment 43 has an outer peripheral surface that is formed with an external gear which serves as the sun gear $S_R$ of the planetary gear mechanism 30R on the right side in FIG. 3. The external gear which serves as the sun gear $S_R$ meshes with the planetary gears $P_R$.

The thrust bearing 47 and the thrust bearing 48 are provided on respective axial opposite ends of the second connection member 32. Each of the thrust bearings 47 and 48 restricts any axial movements that result from the sliding of spline engagement areas which are present between the first and second connection members 31 and 32 and the planetary carriers $C_L$ and $C_R$.

The first connection member 31 is, at an end portion thereof on the right side in FIG. 3, supported via the deep groove ball bearing 49 by the planetary carrier $C_R$. A lubrication hole is provided in the first connection member 31 along an axis thereof.

As shown in FIG. 2, the output gear shafts 14L and 14R has respective output gears 14a or 14a, each having a larger diameter. Rolling bearings 54a and 54a are provided in bearing fitting holes made in the partition wall 11, and rolling bearings 54b and 54b are provided in bearing fitting holes that are made in the left and right lateral housings 9bL and 9bR, respectively. The output gear shafts 14L and 14R are rotatably supported via the rolling bearings 54a and 54b by the speed reducer housing 9.

Outboard ends of the output gear shafts 14L and 14R are exposed from respective openings formed in the respective lateral housing 9bL and 9bR, towards an exterior of the speed reducer housing 9. The exposed outboard ends of the output gear shafts 14L and 14R have outer peripheral surfaces, to each of which an outer joint member of the constant velocity joint 65a is coupled with splines. Each of the constant velocity joints 65a is connected to the drive wheel 61L or 61R (FIG. 1) through an intermediate shaft (not shown) and others.

Figure 4:
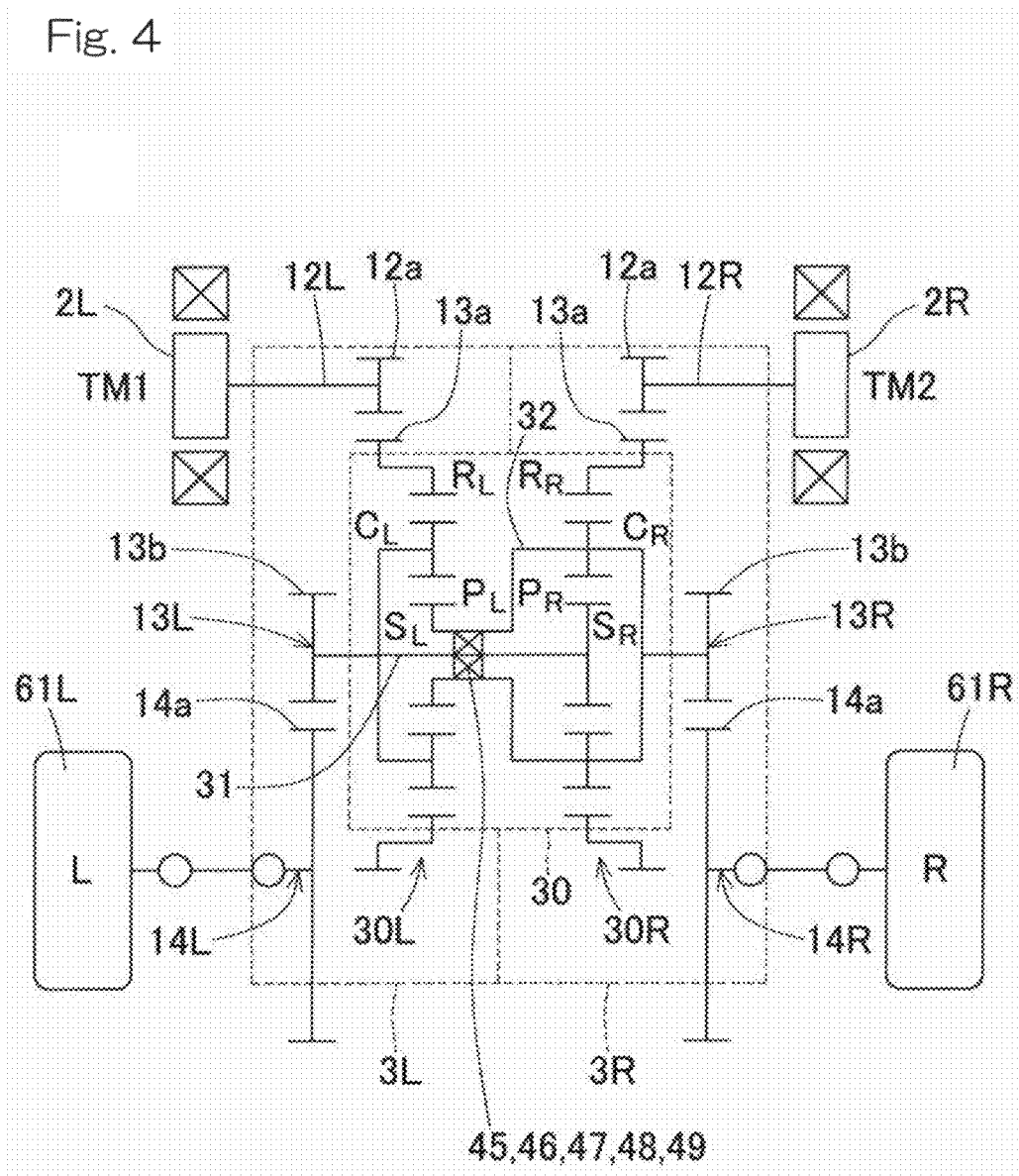
FIG. 4 is a skeleton diagram depicting the left and right wheel drive device of FIG. 1.
Figure 5:
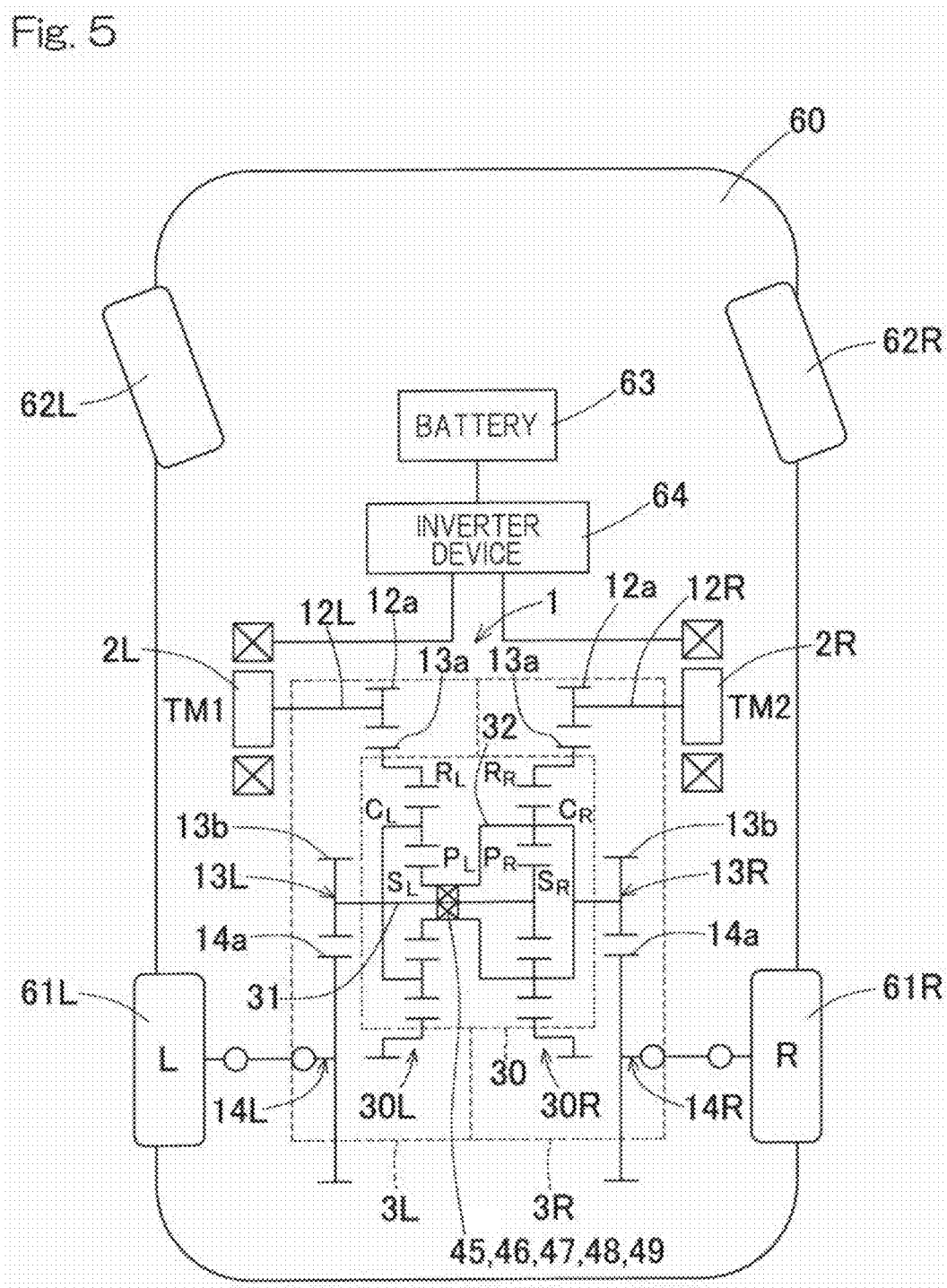
FIG. 5 is an explanatory diagram of an electric vehicle installed with the left and right wheel drive device of FIG. 1.

FIG. 4 is a skeleton diagram depicting the left and right wheel drive device. FIG. 5 is an explanatory diagram of an electric vehicle installed with the left and right wheel drive device. As shown in FIGS. 4 and 5, the left and right electric motors 2L and 2R can be separately or independently controlled by the control device to generate and output different torques.

The torque of each of the electric motors 2L and 2R is amplified according to the ratio of the number of teeth between the input gear 12a of the input gear shaft 12L or 12R and the input-side external gear 13a or 13a, having a larger diameter, of the intermediate gear shaft 13L or 13R in the speed reducer 3L or 3R, before being transferred to the ring gear $R_L$ or $R_R$ of the gearing system 30. Then, each of the torques is further amplified according to the ratio of the number of teeth between the output-side gear 13b or 13b, having a smaller diameter, and the output gear 14a or 14a, before being output to the drive wheel 61L or 61R.

Each of the planetary gear mechanisms 30L and 30R of the gearing system 30 includes a sun gear $S_L$ or $S_R$ and a ring gear $R_L$ or $R_R$ that are coaxially arranged, planetary gears $P_L$ or $P_R$ arranged between the sun gear $S_L$ or $S_R$ and the ring gear $R_L$ or $R_R$, and a planetary carrier $C_L$ or $C_R$ that rotatably supports the planetary gears $P_L$ or $P_R$ and that is arranged coaxially with the sun gear $S_L$ or $S_R$ and the ring gear $R_L$ or $R_R$. Here, the sun gear $S_L$ or $S_R$ and the planetary gears $P_L$ or $P_R$ are external gears having gear teeth on outer peripheries thereof while the ring gear $R_L$ or $R_R$ is an internal gear having gear teeth on an inner periphery thereof. The planetary gears $P_L$ or $P_R$ are in meshing engagement with the sun gear $S_L$ or $S_R$ and the ring gear $R_L$ or $R_R$.

In each of the planetary gear mechanisms 30L and 30R, the sun gear $S_L$ or $S_R$ and the ring gear $R_L$ or $R_R$ rotate in opposite directions when the planetary carrier $C_L$ or $C_R$ is fixed in a non-rotating manner. Thus, on the velocity diagrams shown in FIG. 6, the ring gear $R_L$ or $R_R$ and the sun gear $S_L$ or $S_R$ are depicted on opposite sides with respect to the planetary carrier $C_L$ or $C_R$.

As shown in FIGS. 4 and 5, the gearing system 30 is formed from a first planetary gear mechanism 30L and a second planetary gear mechanism 30R that are assembled together on a common axis, in which the first planetary gear mechanism 30L includes a sun gear $S_L$, a planetary carrier $C_L$, planetary gears $P_L$ and a ring gear $R_L$ and the second planetary gear mechanism 30R includes a sun gear $S_R$, a planetary carrier $C_R$, planetary gears $P_R$ and a ring gear $R_R$, as described earlier.

The planetary carrier $C_L$, which is one of the constituent members of the first planetary gear mechanism 30L, and the sun gear $S_R$, which is one of the constituent members of the second planetary gear mechanism 30R, are connected, resulting in the implementation of the first connection member 31. Similarly, the sun gear $S_L$, which is one of the constituent members of the first planetary gear mechanism 30L, and the planetary carrier $C_R$, which is one of the constituent members of the second planetary gear mechanism 30R, are connected, resulting in the implementation of the second connection member 32.

The torque TM1 generated by the electric motor 2L is transferred from the input gear shaft 12L to the intermediate gear shaft 13L. The torque transferred to this intermediate gear shaft 13L, in turn, is transferred through the first planetary gear mechanism 30L to the smaller-diameter output-side gear 13b of the intermediate gear shaft 13L, the output gear 14a and the output gear shaft 14L, in succession. From the output gear shaft 14L, a drive torque TL (FIG. 6) is output to the drive wheel 61L. Similarly, the torque TM2 generated by the electric motor 2R is transferred from the input gear shaft 12R to the intermediate gear shaft 13R. The torque transferred to this intermediate gear shaft 13R, in turn, is transferred through the second planetary gear mechanism 30R to the smaller-diameter output-side gear 13b of the intermediate gear shaft 13R, the output gear 14a and the output gear shaft 14R, in succession. From the output gear shaft 14R, a drive torque TR is output to the drive wheel 61R.

The outputs from the electric motors 2L and 2R are provided to the respective ring gears $R_L$ and $R_R$ of the two planetary gear mechanisms 30L and 30R, and the outputs from the first and second connection members 31 and 32 are provided to the drive wheels 61L and 61R.

The second connection member 32 is constructed to include a hollow shaft that extends along an axis of the gearing system 30, and the first connection member 31 is inserted into the internal bore of that hollow shaft. The first connection member 31 includes a shaft that extends along the axis of the gearing system 30. The first and second connection members 31 and 32 are arranged on the common axis such that there is an overlapping structure of these shafts. The rolling bearings 45 and 46 are arranged between an outer peripheral surface of the first connection member 31 and an inner peripheral surface of the second connection member 32. The first and second connection members 31 and 32 are mutually supported via the bearings 45 and 46. Both of the first and second connection members 31 and 32 are rotatably supported via the thrust bearing 47 and the deep groove ball bearing 49. Furthermore, besides the bearing 47 and the bearing 49, there are the additional bearings 45 and 46 and the thrust bearing 48 that are arranged between the first and second connection members 31 and 32.

<<Drive Torques and More>>

Figure 6:
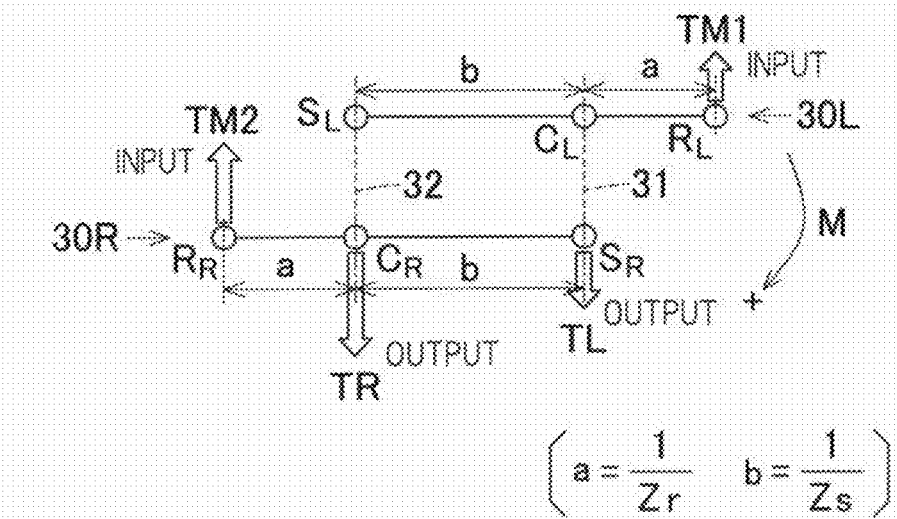
FIG. 6 is a set of velocity diagrams for illustrating a torque difference amplification factor provided by the left and right wheel drive device of FIG. 1.

Now, the drive torques transferred by the gearing system 30 will be described in connection with the velocity diagrams shown in FIG. 6. The gearing system 30, which is formed from the assembly of two identical, single pinion planetary gear mechanisms 30L and 30R, can be represented with two velocity diagrams as illustrated in FIG. 6. In the figure, for the sake of clarity, the two velocity diagrams are displaced to the upper and lower positions so that the velocity diagram on the upper side in FIG. 6 represents the first planetary gear mechanism 30L and the velocity diagram on the lower side in FIG. 6 represents the second planetary gear mechanism 30R.

In principle, the torques TM1 and TM2 output from the respective electric motors 2L and 2R would be—as they are input through the input-side external gears 13a and 13a meshing with the input gears 12a and 12a of the respective input gear shafts 12L and 12R into the respective ring gears $R_L$ and $R_R$ as shown in FIG. 5—modified according to the relevant speed reduction ratios. Furthermore, the drive torques TL and TR output from the respective gearing system 30 would also be—as they are transferred through the smaller-diameter output-side gears 13b and 13b meshing with the output gears 14a and 14a to the respective left and right drive wheels 61L and 61R—modified according to the relevant speed reduction ratios.

Although these speed reduction ratios do modify the torques in the left and right wheel drive device, it is assumed, in the following discussion of the velocity diagrams and various equations and more, that the speed reduction ratios are equal to 1, that the torques input into the respective ring gears $R_L$ and $R_R$ are therefore unchanged from TM1 and TM2, respectively, and that the drive torques therefore remain unchanged from TL and TR as can be seen in FIG. 6, for easier understanding.

In the velocity diagrams, as the gear elements in the two single pinion planetary gear mechanisms 30L and 30R have identical numbers of teeth, the distance between the ring gear $R_L$ and the planetary carrier $C_L$ and the distance between the ring gear $R_R$ and the planetary carrier $C_R$ are equal distances which are to as distances "a." Similarly, the distance between the sun gear $S_L$ and the planetary carrier $C_L$ and the distance between the sun gear $S_R$ and the planetary carrier $C_R$ are equal distances which are referred to as distances "b."

The ratio between the length from each planetary carrier $C_L$ or $C_R$ to the ring gear $R_L$ or $R_R$ and the length from each planetary carrier $C_L$ or $C_R$ to the sun gear $S_L$ or $S_R$ is equal to the ratio between an inverse of the number of teeth Zr of the ring gear $R_L$ or $R_R$, that is, 1/Zr, and an inverse of the number of teeth Zs of the sun gear $S_L$ or $S_R$, that is, 1/Zs. Thus, a=1/Zr and b=1/Zs.

Equation (1) below can be established in view of the balance of a moment M with respect to the point $R_R$. Note that, in FIG. 6, the direction M specified by the depicted arrow indicates the positive direction of the moment.

$$a*TR+(a+b)*TL-(b+2a)*TM1=0 \quad (1)$$

Equation (2) below can be established in view of the balance of a moment M with respect to the point $R_L$.

$$-a*TL-(a+b)*TR+(b+2a)*TM2=0 \quad (2)$$

Equation (3) below can be derived by combining Equation (1) and Equation (2).

$$b*(TR-TL)+(2a+b)*(TM2-TM1)=0$$

$$(TR-TL)=((2a+b)/b)*(TM2-TM1) \quad (3)$$

(2a+b)/b in Equation (3) represents a torque difference amplification factor α. Substituting a=1/Zr and b=1/Zs, α=(Zr+2Zs)/Zr can be derived, resulting in the torque difference amplification factor α as follows:

$$\alpha=(Zr+2Zs)/Zr$$

In this example, the torques from the electric motors 2L and 2R (FIG. 5) are input into the ring gears $R_L$ and $R_R$, respectively, and the torques for the drive wheels 61L and 61R (FIG. 5) are output from $S_R C_L$ and $S_L+C_R$, respectively.

Referring to FIGS. 5 and 6, when different torques TM1 and TM2 are generated by the two electric motors 2L and 2R with an input torque difference ΔTIN (=(TM1−TM2))—assuming that the difference between the rotational speeds of the first connection member 31 and the second connection member 32 is small—the gearing system 30 amplifies the input torque difference ΔTIN, resulting in a drive torque difference α*ΔTIN which is greater than the input torque difference ΔTIN.

That is, despite a small input torque difference ΔTIN, the input torque difference ΔTIN can be amplified in the gearing system 30 according to the aforementioned torque difference amplification factor α (=(Zr+2Zs)/Zr). In this way, the drive torques TL and TR can be transferred to the left drive wheel 61L and the right drive wheel 61R with a drive torque difference ΔOUT (=α*(TM2−TM1)), which is greater than the input torque difference ΔTIN.

However, a large difference between the rotational speeds of the first connection member 31 and the second connection member 32 causes the bearings 45 and 46 and the thrust bearing 48 that are arranged between the first connection member 31 and the second connection member 32, the thrust bearing 47 and the deep groove ball bearing 49 to generate bearing torques, which decreases the difference between the rotational speeds of the first and second connection members 31 and 32. For example, if the first and second connection members 31 and 32 rotate in the same direction with the rotational speed of the first connection member 31 being smaller than that of the second connection member 32, a torque difference between the left and right drive wheels that is calculated using Equation (3) is—assuming that Tb represents a bearing torque—as follows:

$$(TL-TR)=\alpha*(TM1-TM2)-2\Sigma Tb \quad (4)$$

From Equation (4), the drive torque difference that should be created by the electric motors 2L and 2R can be derived as in Equation (5).

$$(TM1-TM2)=\{(TL-TR)-2\Sigma Tb\}/\alpha(=\Delta TOUT') \quad (5)$$

At the same time, the relationship expressed by Equation (6) can be established since the bearing torque Tb does not have an effect on the sum of the drive torques of the left and right drive wheels.

$$(TM1+TM2)=(TL+TR) \quad (6)$$

From Equations (5) and (6), TM1 and TM2 can be determined as expressed in Equations (7) and (8):

$$TM1=\{(TL+TR)+\Delta TOUT'\}/2 \quad (7)$$

$$TM2=\{(TL+TR)-\Delta TOUT'\}/2 \quad (8)$$

Furthermore, the bearing torque Tb can be estimated, for example, using the Palmgren's experiment formula of Equation (9).

$$Tb=M0+M1 \quad (9)$$

M0 in Equation (9), which represents a velocity term, can be calculated using Equation (10) below. M1 in Equation (9), which is a load term, is a constant that does not depend on the relevant rotational speed.

$$M0=f0*10^{-8}(vn)^{2/3}d_p^3 \quad (10)$$

f0 in Equation (10) represents a coefficient which depends on the construction of the bearing 45 or 46, the thrust bearing 47 or 48 or the deep groove ball bearing 49 that is being considered and the kind of lubricant oil used. v represents a kinematic viscosity of the lubricant oil. $d_p$ represents a pitch circle diameter of the bearing 45 or 46, the thrust bearing 47 or 48 or the deep groove ball bearing 49. n represents a rotational speed of the bearing 45 or 46, the thrust bearing 47 or 48 or the deep groove ball bearing 49 and therefore represents a difference between the rotational speeds of the first and second connection members 31 and 32. The kinematic viscosity v of the lubricant oil may be regarded as a constant or may be corrected using a measurement of the temperature of the lubricant oil.

<Configuration of Control Device>

Figure 7:
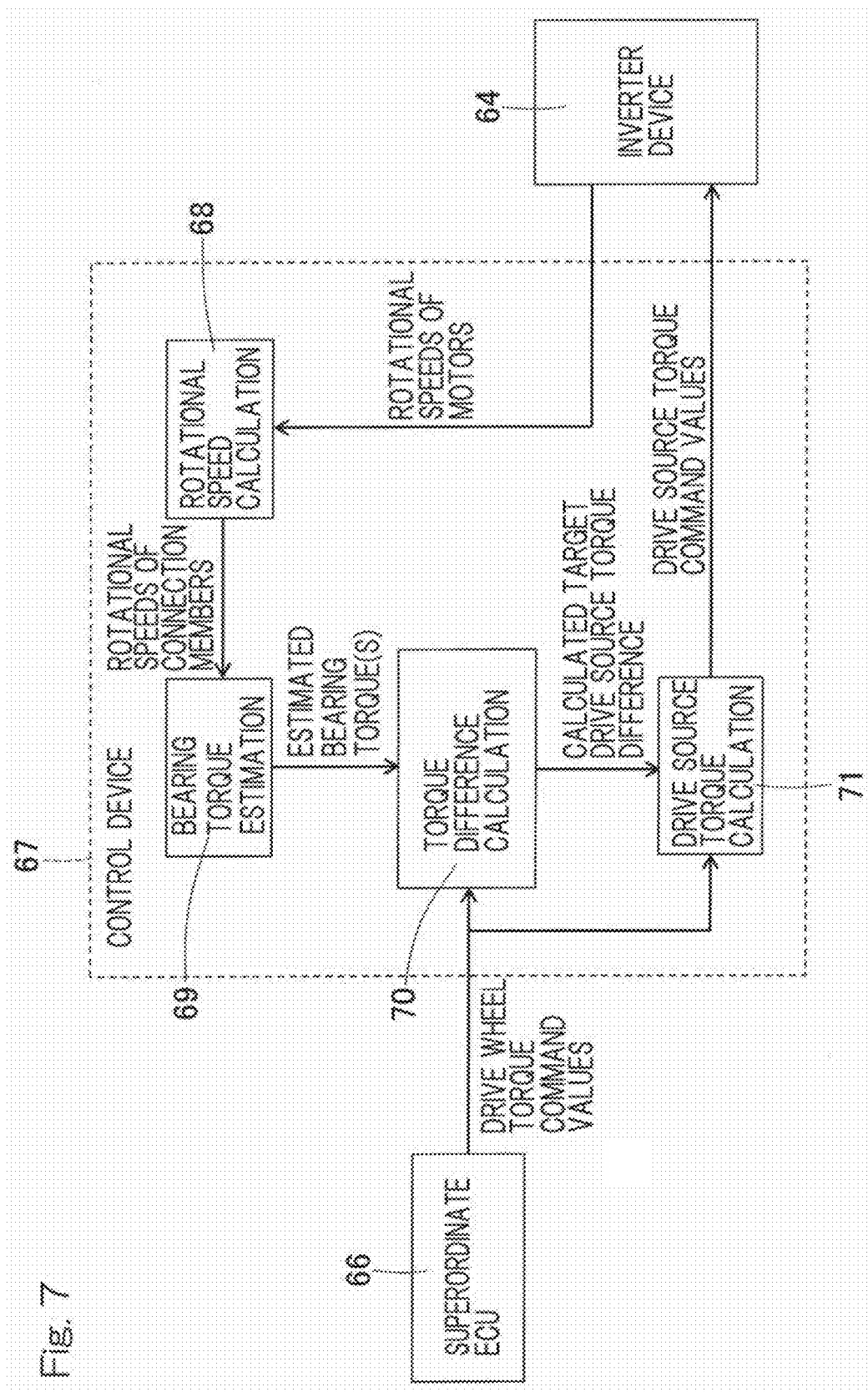
FIG. 7 is a block diagram depicting the configuration of the control device for the left and right wheel drive device of FIG. 1.

As shown in FIG. 7, the control device 67 includes a rotational speed calculation module 68, a bearing torque estimation module 69, a torque difference calculation module 70 and a drive source torque calculation module 71. The rotational speed calculation module 68 calculates and outputs the rotational speeds of the respective first and second connection members 31 and 32 (FIG. 4), from a coefficient that is derived from the numbers of teeth of the gears in the gearing system 30 (FIG. 3) and, for example, rotational speeds of the motors as output from the inverter device 64.

The bearing torque estimation module 69 calculates and outputs an estimate of the bearing torque(s) (which is annotated as "estimated bearing torque(s)" in FIG. 7) using, for example, Equation (10), from a difference between the rotational speeds of the first and second connection members 31 and 32 (FIG. 4). The torque difference calculation module 70 calculates and outputs a target drive torque difference to be created by the electric motors 2L and 2R (FIG. 4) (which is annotated as "calculated target drive source torque difference" in FIG. 7) using Equation (5), from the estimated bearing torque(s), the aforementioned torque difference amplification factor α and a difference between drive wheel torque command values—for the left and right drive wheels—that are provided from the superordinate ECU 66.

The drive source torque calculation module 71 calculates and outputs to the inverter device 64 torques to be generated by the left and right electric motors 2L and 2R (FIG. 4) (left and right drive source torque command values) according to Equations (7) and (8), using the calculated, target drive source torque difference and the left and right drive wheel torque command values provided from the superordinate ECU 66. The inverter device 64 supplies currents to the electric motors 2L and 2R (FIG. 4) in accordance with the drive source torque command values, to drive the electric motors 2L and 2R (FIG. 4).

ADVANTAGEOUS EFFECTS

With the described control device 67 for the left and right wheel drive device, bearing torques generated by the bearings 45, 46, 47, 48 and 49—which are arranged between the first connection member 31 or the first rotational member $C_L$ ($C_R$), on one hand, and the second connection member 32 or the second rotational member $C_R$ (CO, on the other hand—are estimated, and a target torque difference between torques to be created by the two electric motors 2L and 2R is calculated using the bearing torques. In this way, even if there is a large difference between the rotational speeds of the left and right drive wheels 61L and 61R, drive torques substantially matching the originally issued drive wheel torque command values can be effected by calculating a target torque difference using the bearing torques. As such, taking into account the effect of bearing torques allows for precise control of the torques to be generated by the electric motors 2L and 2R. Therefore, the originally intended turning moment is effected. Furthermore, since electric motors 2L and 2R are used as drive sources of the left and right wheel drive device 1, drive torques are controlled with faster response and more precision compared to an internal combustion engine such as a gasoline engine.

In the described embodiment, the speed reduction ratios of the speed reducers 3L and 3R have been assumed to be equal to 1 for easier understanding of the invention. Alternatively, the torque difference calculation module 70 may calculate a target drive torque difference to be created by the electric motors 2L and 2R, on the basis of the estimated bearing torque(s), the torque difference amplification factor and the speed reduction ratios of the speed reducers 3L and 3R.

OTHER EMBODIMENTS

In the discussions that follow, the previous reference characters will be used to denote parts corresponding to features that have already been described in the preceding embodiments, and therefore the description of those parts will not be repeated. Where reference is only made to partial features of a single configuration, the remaining features of the same configuration should be considered as equivalent to those features that have already been described in the preceding embodiments, unless noted otherwise. Identical configurations produce identical advantageous effects. Not only parts that are particularly described in different embodiments can be combined, the embodiments themselves can also be partially combined together, unless such combinations render the device inoperable.

Figure 8:
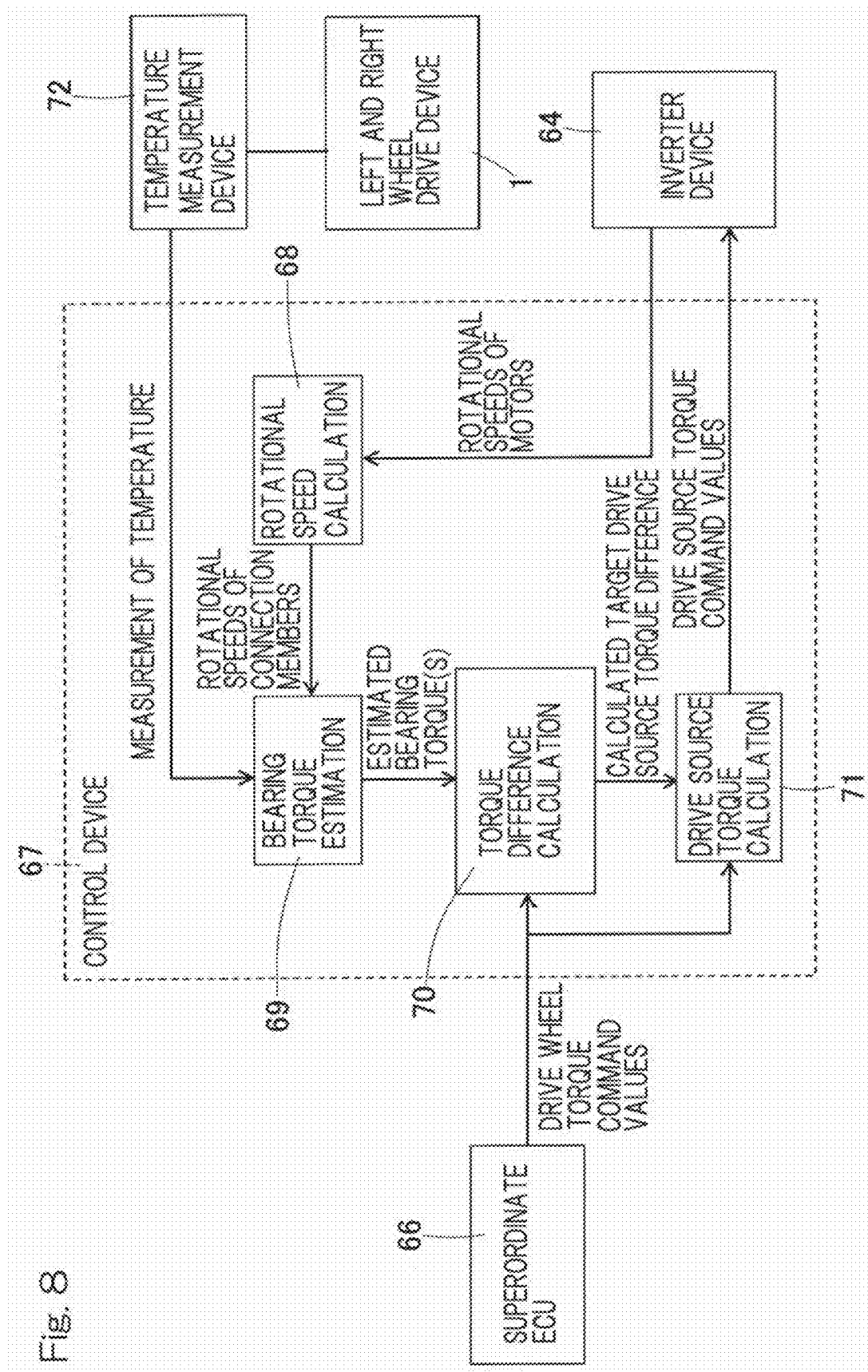
FIG. 8 is a block diagram depicting the configuration of a control device for the left and right wheel drive device, according to a second embodiment of the present invention.

FIG. 8 illustrates an example in which a temperature measurement device 72 is additionally provided in the block diagram of FIG. 7. As shown in FIG. 8, the temperature measurement device 72 is operatively associated with the gearing system 30 (FIG. 3) in the left and right wheel drive device. The temperature measurement device 72 is, for example, a temperature sensor such as a thermistor. The temperature measurement device 72 measures a temperature of the lubricant oil for lubricating the bearings 45, 46, 47, 48 and 49 (FIG. 3) and outputs a measurement of the temperature to the control device 67.

The bearing torque estimation module 69 of the control device 67 uses the input measurement of the temperature to correct the kinematic viscosity v of the lubricant oil in Equation (10) and calculates and outputs the estimated bearing torques. Such correction of the kinematic viscosity v of the lubricant oil according to the measurement of the temperature enables the bearing torques to be more accurately estimated.

In the configuration of FIG. 7 or the configuration of FIG. 8, estimation of the bearing torques by the bearing torque estimation module 69 may only be performed when a difference between the rotational speeds of the first and second connection members 31 and 32 (FIG. 3) that are calculated by the rotational speed calculation module 68 is equal to or more than a predefined threshold value. A computational load on the bearing torque estimation module 69 is reduced by regarding the estimated bearing torques as zero when the aforementioned difference between the rotational speeds is less than the threshold value and by, therefore, causing the torque difference calculation module 70 to perform calculations with the zero, estimated bearing torques.

As shown in FIG. 9, the outputs from the left and right electric motors 2L and 2R may, instead of being provided to the speed reduction gear trains, be directly provided to the respective ring gears $R_L$ and $R_R$ of the planetary gear mechanisms 30L and 30R, and the outputs from the first and second connection members 31 and 32 may be provided via the motor shafts 5a and 5a of the electric motors 2L and 2R and through subsequent speed reduction by the speed reduction gear trains 73 and 74 to the drive wheels 61L and 61R. Note that the speed reduction gear trains 73 and 74 are constructed with identical ratios of the number of teeth. Also in the configuration of FIG. 9, the bearing torques generated by the bearings 47 and 49 that are used to rotatably support the first connection member 31 and the second connection member 32 and the bearing torques generated by the bearings 45, 46 and 48 that are arranged between the first and second connection members 31 and 32 are estimated in a likewise manner, and a target torque difference to be created by the two electric motors 2L and 2R is similarly calculated using the bearing torques, thereby producing a set of advantageous effects that are similar to those of the previous embodiments.

Although, in the embodiment shown in FIGS. 2 and 3, the planetary carrier $C_L$ of the first planetary gear mechanism 30L and the sun gear $S_R$ of the second planetary gear mechanism 30R are connected so as to implement the first connection member 31, and the sun gear $S_L$ of the first planetary gear mechanism 30L and the planetary carrier $C_R$ of the second planetary gear mechanism 30R are connected so as to implement the second connection member 32, it should be understood that this is a non-limiting example.

For example, the sun gear $S_L$ of the first planetary gear mechanism 30L and the ring gear $R_R$ of the second planetary gear mechanism 30R may be connected so as to implement the first connection member 31, and the ring gear $R_L$ of the first planetary gear mechanism 30L and the sun gear $S_R$ of the second planetary gear mechanism 30R may be connected so as to implement the second connection member 32.

Also, the planetary carrier $C_L$ of the first planetary gear mechanism 30L and the ring gear $R_R$ of the second planetary gear mechanism 30R may be connected so as to implement the second connection member 32.

The drive sources of the left and right wheel drive device are not limited to electric motors, but may also employ an internal combustion engine such as a gasoline engine.

The bearings 45 and 46 between the first and second connection members 31 and 32 may be other than needle roller bearings and can be, for example, rolling bearings such as deep groove ball bearings, angular contact ball bearings, etc.

While the present invention has been described with reference to preferred embodiments thereof in connection with the drawings, various additions, modifications or omissions may be made therein without departing from the gist of the invention, which are, thus, also included within the scope of the present invention.

REFERENCE NUMERALS

1 . . . left and right wheel drive device
2L, 2R . . . first and second electric motors (drive sources)
30 . . . gearing system
30L, 30R . . . planetary gear mechanisms
31, 32 . . . first and second connection members
45, 46 . . . bearings
47 . . . thrust bearing (bearing)
48 . . . thrust bearing (bearing)
49 . . . deep groove ball bearing (bearing)
61L, 61R . . . drive wheels
67 . . . control device
68 . . . rotational speed calculation module
69 . . . bearing torque estimation module
70 . . . torque difference calculation module
71 . . . drive source torque calculation module
$C_L$, $C_R$ . . . planetary carriers (first and second rotational members)

What is claimed is:

1. A control device for a left and right wheel drive device, wherein
the left and right wheel drive device includes
two independently controllable drive sources installed in a vehicle and
a gearing system disposed between the two drive sources and left and right drive wheels for transferring torques supplied from the two drive sources to the respective left and right drive wheels while amplifying a difference between the supplied torques, the gearing system including first and second planetary gear mechanisms, each including a plurality of constituent members, a set of the first and second planetary gear mechanisms including:
a first connection member that connects a first constituent member among the plurality of constituent members of the first planetary gear mechanism and a second constituent member among the plurality of constituent members of the second planetary gear mechanism;
a second connection member that connects a second constituent member among the plurality of constituent members of the first planetary gear mechanism and a first constituent member among the plurality of constituent members of the second planetary gear mechanism;
a first rotational member that rotates as a unit with the first connection member, the first rotational member being at least one of the plurality of constituent members of the first planetary gear mechanism;
a second rotational member that rotates as a unit with the second connection member, the second rotational member being at least one of the plurality of constituent members of the second planetary gear mechanism; and
a bearing arranged between the first connection member or the first rotational member, on one hand, and the second connection member or the second rotational member, on the other hand, wherein the control device comprises:
a rotational speed calculation module configured to calculate rotational speeds of the respective first and second connection members;
a bearing torque estimation module configured to:
when a difference between the two rotational speeds calculated by the rotational speed calculation module is equal to or more than a threshold value, estimate a bearing torque generated by the bearing, from the two rotational speeds calculated by the rotational speed calculation module, and
when a difference between the two rotational speeds calculated by the rotational speed calculation module is less than the threshold value, to estimate the bearing torque as zero;
a torque difference calculation module configured to calculate a target torque difference between torques to be generated by the two respective drive sources, using a difference between left and right drive wheel torque command values for the respective left and right drive wheels, the bearing torque estimated by the bearing torque estimation module, and a torque difference amplification factor of the gearing system; and a drive source torque calculation module configured to calculate drive source torque command values, which are torques to be generated by the two respective drive sources, using the target torque difference calculated by the torque difference calculation module and the left and right drive wheel torque command values.

2. The control device for the left and right wheel drive device as claimed in claim 1, wherein when the difference between the two rotational speeds calculated by the rotational speed calculation module is equal to or more than the threshold value, the bearing torque estimation module is further configured to estimate the bearing torque generated by the bearing, from a temperature determined by a temperature measurement device that measures a temperature of lubricant oil for lubricating the bearing and from the two rotational speeds calculated by the rotational speed calculation module.

3. The control device for the left and right wheel drive device as claimed in claim 1, wherein each of the first and second planetary gear mechanisms includes a ring gear, a planetary carrier arranged coaxially with the ring gear and a sun gear arranged coaxially with the ring gear, wherein the first constituent member of the first planetary gear mechanism is the planetary carrier thereof, wherein the second constituent member of the second planetary gear mechanism is the sun gear thereof, wherein the second constituent member of the first planetary gear mechanism is the sun gear thereof, wherein the first constituent member of the second planetary gear mechanism is the planetary carrier thereof, and wherein the gearing system has the first and second connection members as input members and has the ring gears of the two planetary gear mechanisms as output members.

4. The control device for the left and right wheel drive device as claimed in claim 1, wherein each of the two drive sources comprises an electric motor.

\* \* \* \* \*